(12) United States Patent
Girondi

(10) Patent No.: US 11,224,832 B2
(45) Date of Patent: Jan. 18, 2022

(54) FILTER CARTRIDGE WITH VENTILATION DEVICE

(71) Applicant: UFI FILTERS S.P.A., Porto Mantovano (IT)

(72) Inventor: Giorgio Girondi, Porto Mantovano (IT)

(73) Assignee: UFI Filters S.P.A., Porto Mantovano (IT)

( * ) Notice: Subject to any disclaimer, the term of this patent is extended or adjusted under 35 U.S.C. 154(b) by 84 days.

(21) Appl. No.: 16/628,366

(22) PCT Filed: Jul. 5, 2018

(86) PCT No.: PCT/IB2018/054976
§ 371 (c)(1),
(2) Date: Jan. 3, 2020

(87) PCT Pub. No.: WO2019/008536
PCT Pub. Date: Jan. 10, 2019

(65) Prior Publication Data
US 2020/0171416 A1    Jun. 4, 2020

(30) Foreign Application Priority Data
Jul. 7, 2017   (IT) .................. 102017000076718

(51) Int. Cl.
*B01D 36/00*    (2006.01)
*B01D 29/21*    (2006.01)
(Continued)

(52) U.S. Cl.
CPC .......... *B01D 36/001* (2013.01); *B01D 29/21* (2013.01); *B01D 29/52* (2013.01); *B01D 35/005* (2013.01);
(Continued)

(58) Field of Classification Search
CPC ...... B01D 36/001; B01D 29/21; B01D 29/52; B01D 35/005; B01D 35/30; B01D 2201/282; B01D 35/18
See application file for complete search history.

(56) References Cited

U.S. PATENT DOCUMENTS 3,744,641 A   7/1973   Schmidt
4,673,500 A   6/1987   Hoofnagle

FOREIGN PATENT DOCUMENTS

EP        2062634 A1    5/2009

OTHER PUBLICATIONS

International Search Report and Written Opinion for PCT/IB2018/054976 dated Oct. 26, 2018.
(Continued)

*Primary Examiner* — Waqaas Ali
(74) *Attorney, Agent, or Firm* — Thomas|Horstemeyer LLP

(57) ABSTRACT

A filter cartridge for a fuel circulation circuit of a vehicle. The filter cartridge comprises a cartridge body identifying a filtration chamber. In said filtration chamber, the filter cartridge further comprises at least one filter insert which divides said filtration chamber into a dirty chamber containing fuel to be filtered and a clean chamber containing filtered fuel.

The filter cartridge further comprises a ventilation device suitable to ventilate in the dirty chamber, wherein the ventilation device comprises at least one ventilation duct placed in an upper area of the filtration chamber in which the air floating in the fuel accumulates. Said ventilation duct has a plurality of ventilation holes mutually spaced from one another through which the air is removed from the filtration chamber.

20 Claims, 5 Drawing Sheets

(51) Int. Cl.
*B01D 29/52* (2006.01)
*B01D 35/00* (2006.01)
*B01D 35/30* (2006.01)

(52) U.S. Cl.
CPC ........ *B01D 35/30* (2013.01); *B01D 2201/282* (2013.01)

(56) References Cited

OTHER PUBLICATIONS

Italian Search Report and Written Opinion for IT201700076718 dated Feb. 23, 2018.

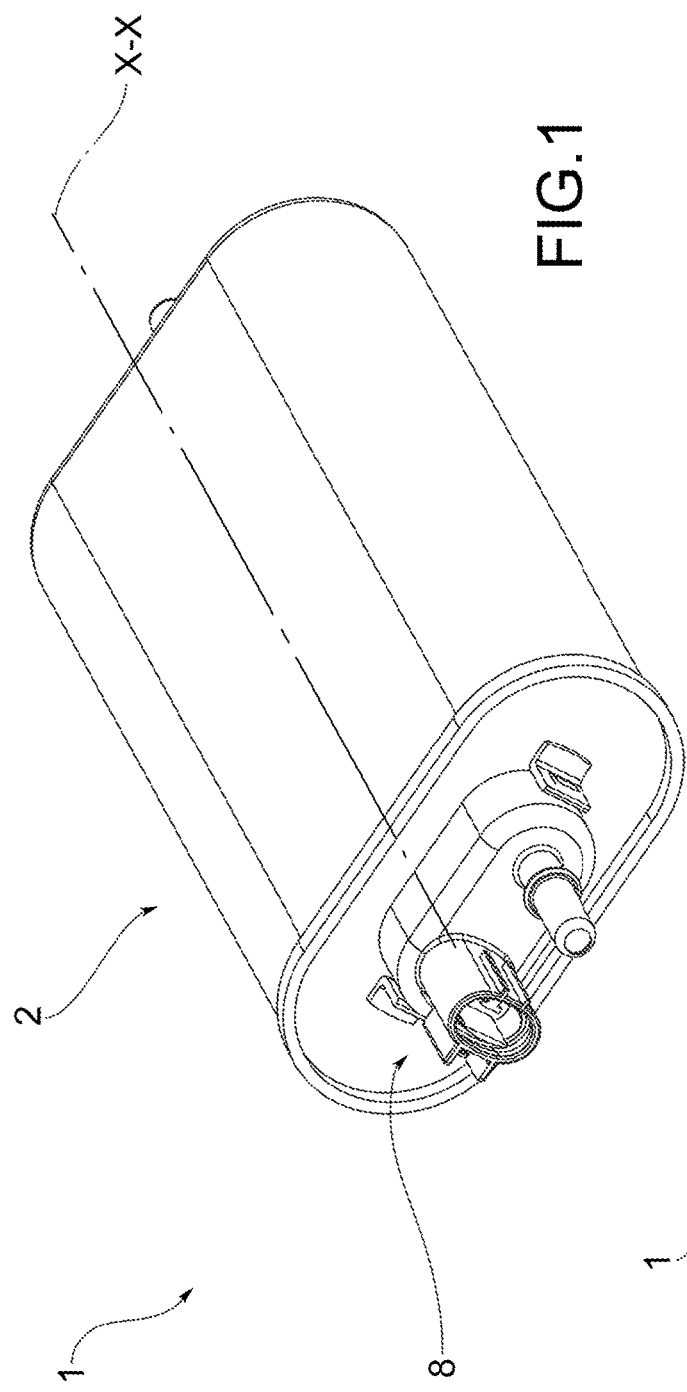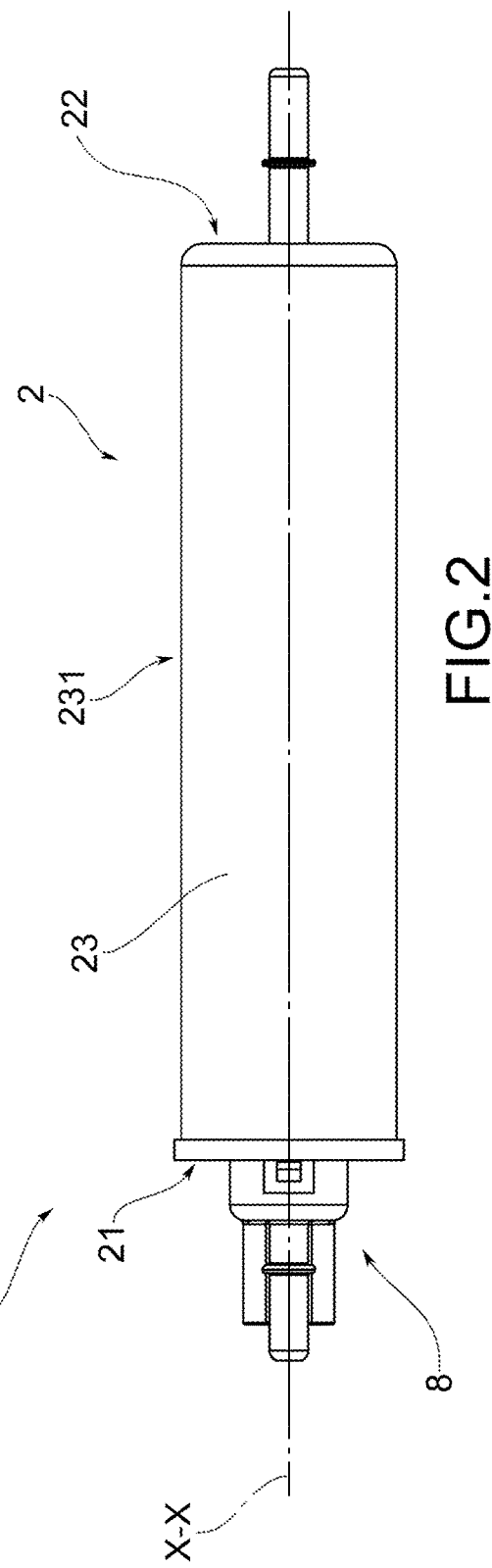

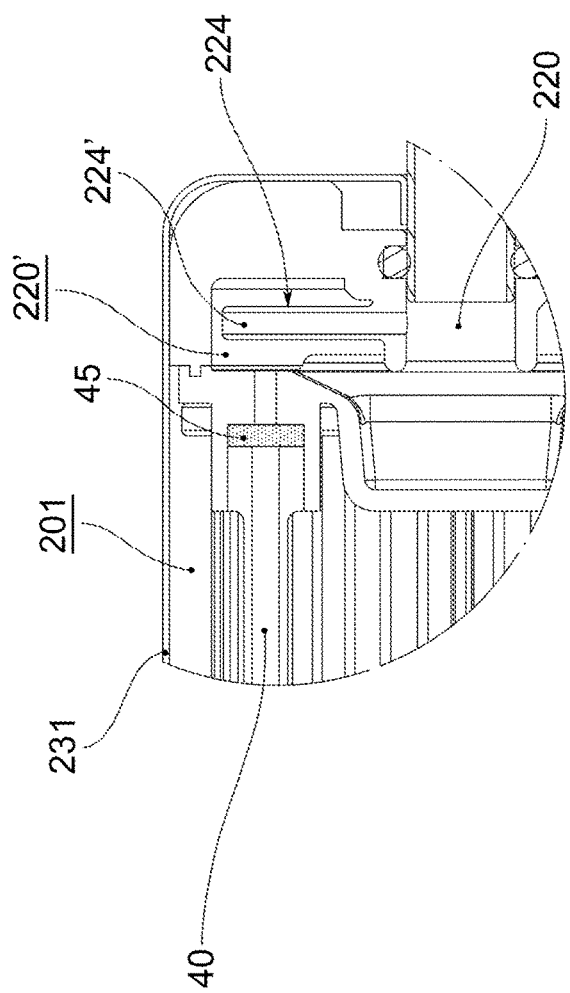
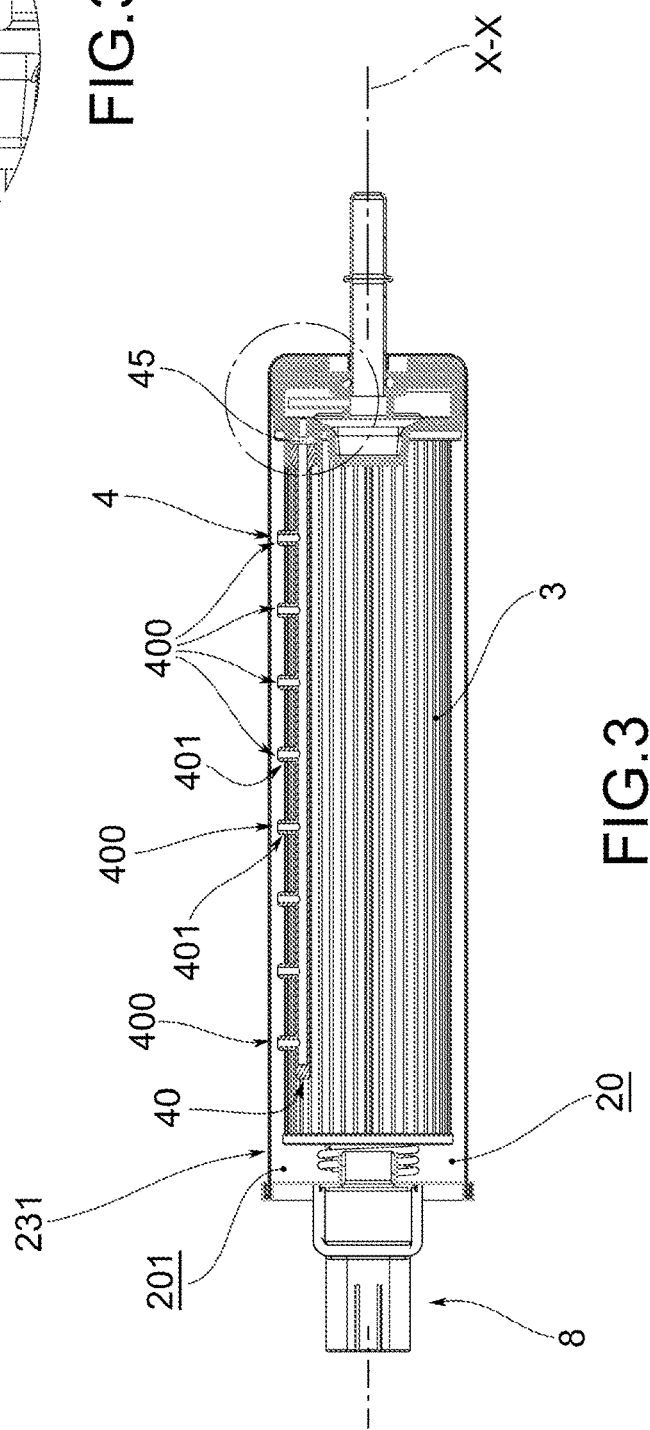
FIG.3a
FIG.3

FILTER CARTRIDGE WITH VENTILATION DEVICE

CROSS-REFERENCE TO RELATED APPLICATIONS

This application is the 35 U.S.C. § 371 national stage application of PCT Application No. PCT/IB2018/054976, filed Jul. 5, 2018, where the PCT claims priority to, and the benefit of, Italian application having Ser. No. 10/2,017,000, 076,718, filed Jul. 7, 2017, both of which are herein incorporated by reference in their entireties.

FIELD OF APPLICATION

The present invention relates to a filter cartridge of a fuel circulation circuit of a vehicle.

Specifically, the fuel circulation circuit, in which the fuel is placed in circulation from the tank to the combustion chamber, typically requires the presence of a filter cartridge for filtering out the unwanted presence of suspended particles.

The present invention thus falls within such specific context, in particular, the filter cartridge of the present invention has a preferred, but non-limiting application in the filtration of fuels, preferably diesel.

The main problem of the known filter cartridges is that of not performing efficiently the fuel filtration operations when there is an accumulation of gases and/or air, referred to herein by the term "air", inside them.

Typically such accumulation of air is a result of the ignition operations following replacement of the cartridge. But it is not uncommon even during normal vehicle use for air bubbles to be created due to the presence of a certain amount of dissolved substances in the gaseous state in the fuel.

In addition, another problem related to the presence of large air bubbles inside the fuel circulation circuit is related to the fact that these air bubbles can cause significant damage to the components included in the circuit such as pumps and/or injectors.

In particular, because of its specific gravity, air tends to accumulate in the upper part of the filter cartridge; for this reason, therefore, it must be disposed of during the operation of the vehicle and in particular of the filter cartridge.

In order to overcome this problem, in the prior art, it is known to provide bypass holes in the cartridges through which the air can flow out.

However these solutions are not particularly effective: for example, in some operating conditions of the vehicle, such as on inclined planes uphill or downhill the air floats in areas far from such bypass holes thereby not flowing away and causing the above problems in the operation of the filter cartridge.

One example of an embodiment of a filter cartridge having such drawbacks is illustrated in the document EP2062634.

All the more, this drawback occurs in filter cartridges which instead of operating vertically have a horizontal or inclined arrangement in the vehicle.

Solution According to the Invention

The need is therefore strongly felt to provide a filter cartridge that has a ventilation device suitable for aspirating air resolving the aforesaid drawbacks of the solutions of the prior art.

The purpose of the present invention is to provide a filter cartridge in which the filtering operations are always performed efficiently and effectively, avoiding that in any condition of the vehicle there is an accumulation of air inside it. Preferably, the purpose of the present invention is to have a filter cartridge which has such technical advantages even when placed in the vehicle in a substantially horizontal position. In addition, the purpose of the present invention is to prevent large air bubbles from flowing in the fuel circulation circuit, thus avoiding the risk that these may cause damage to the components of the vehicle.

Such purpose is achieved by a filter cartridge as claimed in claim 1. The dependent claims show preferred embodiment variants having further advantageous aspects.

DESCRIPTION OF THE DRAWINGS

Further characteristics and advantages of the invention will, in any case, be evident from the description given below of its preferred embodiments, made by way of a non-limiting example with reference to the appended drawings, wherein:

FIG. 1 shows a perspective view of a filter cartridge according to the present invention, according to a preferred embodiment;

FIG. 2 is a side view of the filter cartridge in FIG. 1;

FIGS. 3 and 3a respectively illustrate a side view in longitudinal cross-section of the filter cartridge in FIG. 2 and an enlargement of a portion thereof;

DETAILED DESCRIPTION

Figure 4:
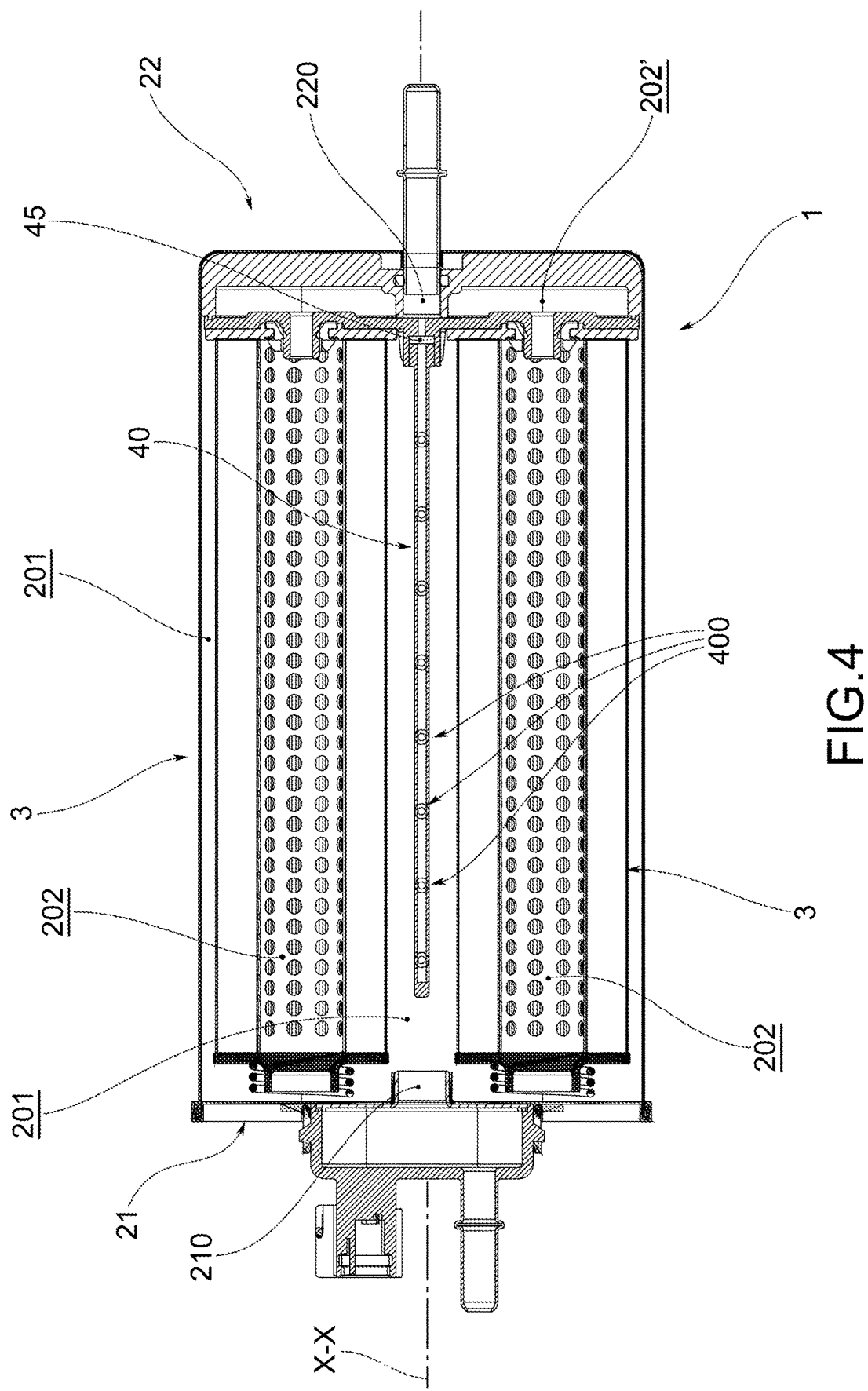
FIG. 4 shows a longitudinal cross-section view from above of the filter cartridge in FIG. 2.
Figure 5:
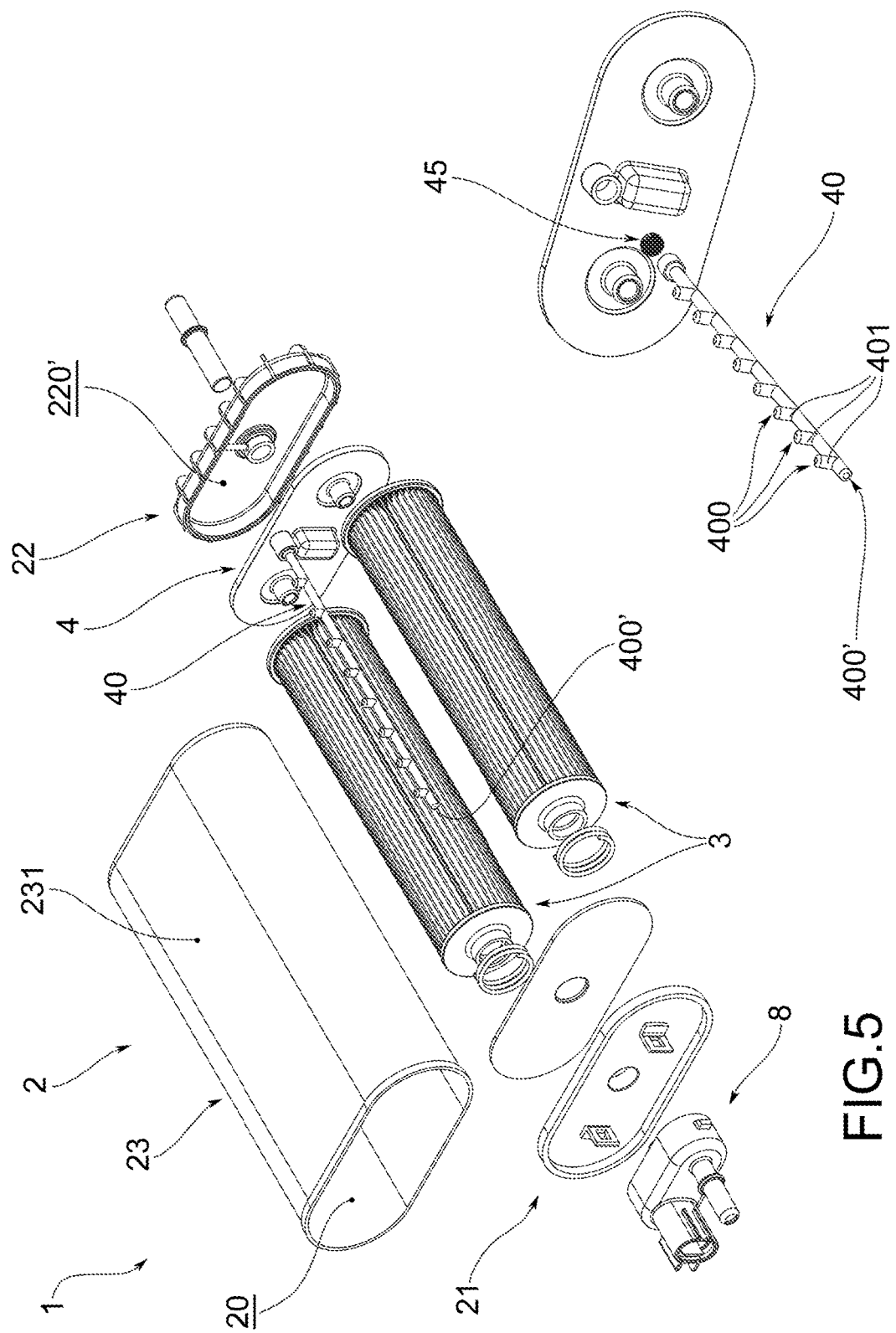
FIGS. 5 and 5' respectively show two perspective views in separate parts of the filter cartridge according to a preferred embodiment and a ventilation device comprised therein.
Figure 6:
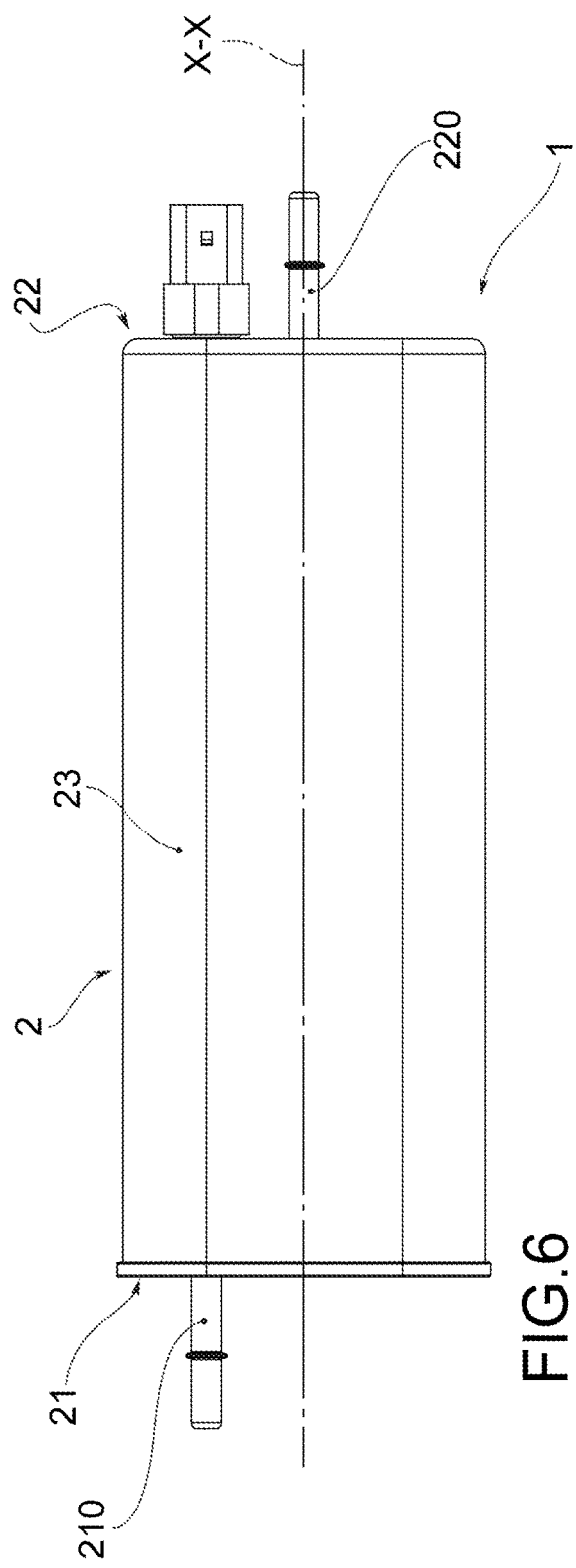
FIG. 6 shows a side view of a filter cartridge according to the present invention, according to a further embodiment.
Figure 7:
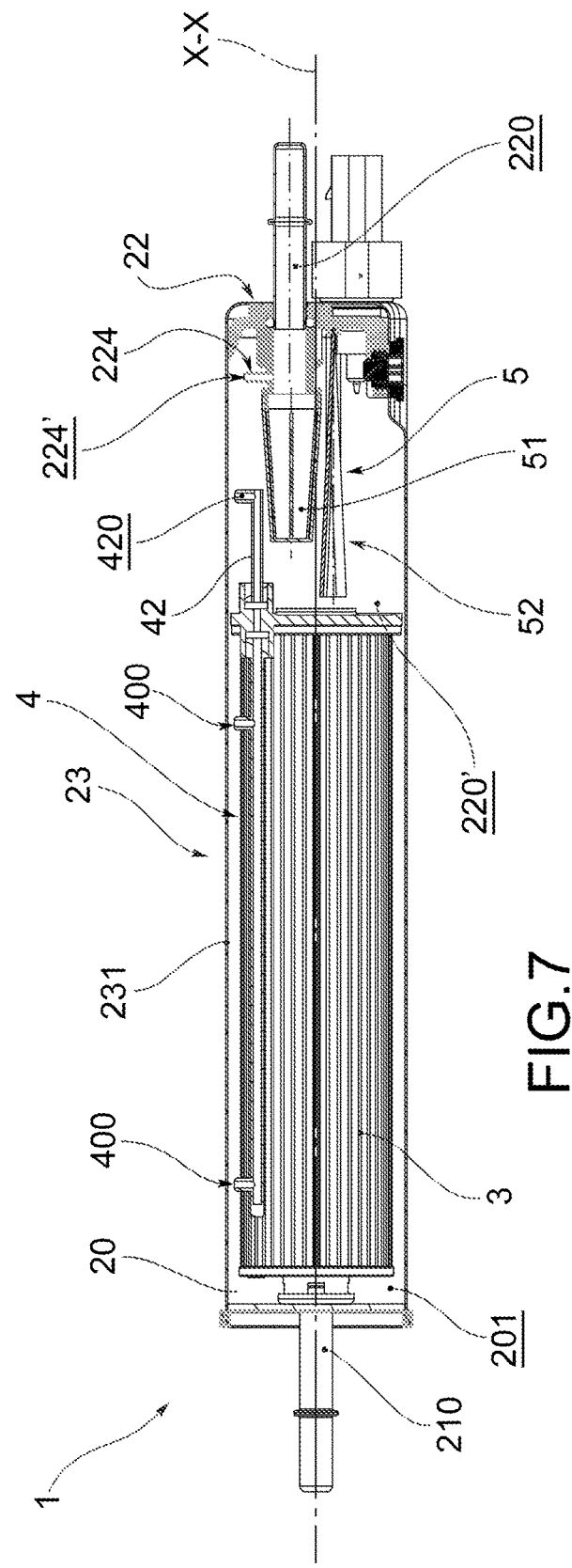
FIG. 7 shows a side longitudinal sectional view of the filter cartridge in FIG. 6.

In the appended drawings, reference numeral 1 globally denotes a filter cartridge according to the present invention, in a preferred embodiment.

Specifically, the filter cartridge 1 is specially suitable to be inserted in a fuel circulation circuit of a vehicle. That is to say that the filter cartridge 1 is housable in a vehicle and that it is suitable to fluidically feed inlet and/or outlet channels and ducts of the aforesaid circulation circuit. This circuit is directly connected to the engine group of the vehicle, and in particular to its fuel supply means and fluidically connected to the combustion chamber of the internal combustion engine. Preferably, in fact, the filter cartridge 1 of the present invention has dimensions such as to be housed in the engine compartment of a vehicle or is attached directly to the frame of the vehicle in a position between the tank and the engine.

According to the present invention, therefore the filter cartridge 1 comprises a cartridge body 2 fluidically connected to the fuel circulation circuit comprising an inlet mouth 210 and an outlet mouth 220.

In the cartridge body 2, between the inlet mouth 210 and the outlet mouth 220, a filtration chamber 20 is made. That is to say that dirty fluid, i.e. fuel to be filtered, enters the inlet mouth 210, while clean fluid, i.e. filtered fuel, comes out of the outlet mouth 220.

According to a preferred embodiment, the filtration chamber 20 extends along a main axis X-X.

Preferably, said cartridge body 2 is substantially box-shaped. As shown in the appended figures by way of example, the cartridge body 2 is designable in specific shapes, for example with moulded-rounded corners.

In particular, the cartridge body 2 comprises two axial ends positioned at the two ends with respect to the main axis X-X: an inlet end 21 comprising the inlet mouth 210 and an outlet end 22 comprising the outlet mouth 220.

According to a preferred embodiment, the cartridge body 2 also comprises perimeter side walls 23 which define the filtration chamber 20 laterally. Preferably, said side walls 23 extend between an inlet end 21 and an outlet end 22. Preferably, said side walls 23 extend parallel to the main axis X-X.

According to a preferred embodiment, the upper side wall 231 is identified as the wall facing upward. That is to say that, with the filter cartridge 1 positioned in the vehicle in a horizontal or substantially horizontal position, in relation to the ground plane which the vehicle moves on, the upper side wall 231 is the wall distal from said ground plane. In other words, with the filter cartridge 1 positioned in the vehicle in a horizontal or substantially horizontal position, i.e. with the main axis X-X parallel, or substantially parallel to the ground plane, the upper side wall 231 is the one distal from said ground plane.

Preferably, the cartridge body 2 and in particular the filtration chamber 20 identifies an upper area as the area (i.e. the region, i.e. the zone) in which the air bubbles which due to their specific weight float in the fuel, accumulate.

Specifically, in the operating configuration described above in which the filter cartridge 1 is placed in a horizontal position, the upper area is identified proximal to the upper side wall 231.

The filter cartridge 1 further comprises a filter insert 3, housed in the filtration chamber 20, to filter the fuel. In particular, said filter insert 3 divides said filtration chamber 20 into a dirty chamber 201, or first chamber, containing fuel to be filtered in fluidic communication with the inlet mouth 210 and a clean chamber 202, or second chamber, containing the filtered fuel in fluidic communication with the outlet mouth 220. According to a preferred embodiment of the present invention, the filter insert 3 has a dirty side facing the dirty chamber 201 and a clean side facing the clean chamber 202.

The filter insert 3 also extends along the main axis X-X.

According to a preferred embodiment, the at least one filter insert 3 is of the tubular type, traversable radially from the outside to the inside. In other words, the filter insert 3, housed in the filtration chamber 20, defines the dirty chamber 201 outside it and the clean chamber 202 inside it.

Preferably therefore, the outer side of the filter insert 3 is its outer cylindrical surface while the inner side of the filter insert 3 is its inner cylindrical surface.

According to a preferred embodiment, the filter cartridge 1 comprises a plurality of filter inserts 3, arranged parallel to each other along the main axis X-X. Preferably, said filter inserts 3 are of the tubular type so as to identify said dirty chamber 201 outside them while inside each of them they identify a corresponding clean chamber 202.

According to a preferred embodiment of the invention, the filter cartridge 1 comprises two filter inserts 3, preferably of the tubular type.

According to a preferred embodiment, the outlet end comprises an outlet antechamber 220' fluidically arranged between the filtration chamber 20 and the outlet mouth 220.

In particular, therefore, the clean chamber 202 (or clean chambers 202) is fluidically connected to the outlet antechamber 220'; in the embodiment in which there are a plurality of clean chambers 202, for example as in the embodiment comprising a plurality of tubular filter inserts 3, each clean room 202 defined is fluidically associated with said outlet antechamber 220' to then flow into the outlet mouth 220.

According to a preferred embodiment, moreover, other auxiliary components are also housed in said outlet antechamber 220': for example, the outlet antechamber 220' houses a water separation unit 5 for separating water particles from the fuel preferably comprising a separation device 51 which is crossable by the fuel on which the water separation action is carried out, and a blocking device 52 positioned below the separation device 51 adapted to prevent the return of water separated from fuel and accumulated on the lower bottom of the outlet antechamber 220' to said separation device 51. In other words, the outlet antechamber 220' extends by an axial section longitudinally to the main axis X-X.

Preferably, as shown, for example in the appended drawings, each filter insert 3 comprises a filter medium closed at the ends by two end plates.

According to the present invention, the filter cartridge 1 further comprises a ventilation device 4 suitable to remove the air present in the dirty chamber 201.

In particular, the ventilation device 4 includes at least one ventilation duct 40 through which air can be removed from the filtration chamber.

According to the present invention, the ventilation duct 40 is positioned in the aforesaid upper area of the filtration chamber 20. Preferably, therefore the ventilation duct 40 is positioned in the filtration chamber 20 in a position where it accumulates the largest quantity of air.

Said ventilation duct 40 extends in length presenting a plurality of axially spaced 400 ventilation holes. In particular, preferably, said ventilation duct 40 extends along the main axis X-X.

According to a preferred embodiment described above, therefore, the main ventilation duct 40 extends preferably in such a way as to be horizontal or substantially horizontal to the ground plane.

For example, according to a preferred embodiment, the ventilation duct 40 is positioned in a position proximal to an upper wall of the cartridge body 2, for example to the upper side wall 231 of the cartridge body 2.

In a preferred embodiment, the ventilation device 4 is integrated at least in part with the cartridge body 2; for example in a preferred embodiment, the ventilation duct 40 is made on the upper side wall 231 of the cartridge body 2.

In a further preferred embodiment, such as for example that shown in the appended figures, the ventilation duct 40 is a separate component from the cartridge body 2.

According to a preferred embodiment, the ventilation duct 40 extends substantially along the entire axial length of the filtration chamber 20. Specifically, the ventilation duct 40 extends substantially at least beyond the centreline of the axial length of the cartridge body.

According to a preferred embodiment, the ventilation holes 400 have a diameter such as to facilitate the passage of air compared to that of the fuel. In other words, the ventilation holes 400 are calibrated with dimensions large enough to take advantage of the different physical properties between air and fuel to facilitate the passage of air compared to the fuel.

In other words, the ventilation holes 400 are sized in such a way as to oppose a higher resistance to the passage of diesel compared to the passage of air.

Preferably through the ventilation holes 400 the air is aspirated into small bubbles, breaking any larger air bubbles or otherwise preventing large air bubbles from reaching the outlet duct.

For example, preferably, the ventilation holes 400 have a diameter to the order of 1 mm, preferably between 0.5 and 4 mm.

According to preferred embodiments of the invention, the duct 40 has specific ventilation "spouts" 401 which extend preferably radially from the main direction of extension of the duct containing the holes 400 therein. Preferably, by means of said ventilation spouts 401 the ventilation holes 400 are placed in a position closer to the top of the filtration chamber 20, as shown for example in the appended figures.

According to further preferred embodiments, the ventilation duct 40 comprises at least one head ventilation hole 400' placed at its distal end (or head). Preferably, said head ventilation hole 400' is thus made on the extension axis of the duct. Preferably, said head ventilation hole 400' is thus housed in a position opposite with respect to the outlet end; in other words, preferably, the centreline of the cartridge body 2 lies between the head ventilation hole 400' and the outlet end 22.

In some embodiments, the ventilation duct 40 has only said head ventilation hole 400' and no side ventilation holes 400.

According to further preferred embodiments, the ventilation device 4 comprises a plurality of ventilation ducts 40.

According to a preferred embodiment, the ventilation duct 40 is a replaceable element as is the filter insert 3 and/or filter inserts 3. In other words, preferably, the ventilation duct 40 can be dismantled from the cartridge body 2.

Moreover, according to a further preferred embodiment, the ventilation device 4 is at least partly integrated with at least one filter insert 3. Specifically, in fact, the main ventilation duct 40 is suitable to extend in a position proximal to the dirty side of the filter insert 3. According to a preferred embodiment, in fact, the ventilation duct 40 extends in length starting from at least the end plates of the filter insert 3.

The type of circulation circuit of the vehicle establishes the mode of operation of the filter cartridge 1. Specifically, in fact, embodiments of the circulation circuit are provided for in which a suction pump is included, placed downstream of the filter cartridge, 1, which is suitable to perform a suction action of the fuel through the filter insert 3. In addition, embodiments of the circulation circuit are provided for in which a pressure pump is included, placed upstream of the filter cartridge, 1, which is suitable to perform a thrust action of the fuel through the filter insert 3.

In other words, the circulation circuit comprises at least one pump suitable to perform the action described above (suction or thrust) on the fuel, causing the latter to pass through the inlet mouth 210, the filtration chamber 20 (also through the filter insert 3) and the outlet mouth 220.

According to a preferred embodiment, the ventilation device 4 is fluidically connected to the outlet mouth 220. Preferably, therefore, air and/or fuel moved through the ventilation duct 40 flows into the outlet mouth 220.

In particular, said action of moving the fuel through the outlet mouth 220 (induced by a pump either in suction or thrust) also induces the ventilation action through the ventilation duct 40. In other words, the pump in the fuel circulation circuit which performs the action of moving the fuel through the filter cartridge 1 and in particular through the filtration chamber 20 performs the ventilation action through the ventilation duct 40. In particular, therefore, the action of moving the fuel in the filtration chamber 20 takes place simultaneously with the ventilation action of the air as long as this is present inside the filtration chamber 20.

Preferably, once the air in the filtration chamber 20 is finished, fuel flows through the ventilation duct 40; however, as described, depending on the geometry of the ventilation duct 40 and ventilation holes 400, the fluid finds less resistance to crossing the at least one filter insert 3.

According to a preferred embodiment, the ventilation duct 40 is in turn fluidically connected to the outlet mouth 220 through the outlet antechamber 220'.

According to a preferred embodiment, the ventilation duct 40 also comprises an auxiliary ventilation section 42 which extends parallel to the main axis X-X into the outlet antechamber 220'. Preferably, the auxiliary ventilation section 42 extends substantially along the entire axial length of the outlet antechamber 220'. In particular, the auxiliary ventilation duct 42 extends substantially at least beyond the centre line of the axial length of the outlet antechamber 220'.

According to a preferred embodiment, the auxiliary ventilation section 42 is intended to channel the air suctioned through the ventilation duct 40, as described above, in an upper region of the outlet antechamber 220', proximal to the upper side wall 231.

As for the ventilation duct 40, also the auxiliary ventilation section 42 comprises at least one auxiliary ventilation hole 420 through which the suctioned air escapes.

Preferably, the outlet mouth 220 also has an air ventilation tube 224 to aspirate any air accumulated in the outlet antechamber 220. Preferably, the tube ventilation hole 224' of the air ventilation tube 224 is placed in a position such as to be near the top of the outlet antechamber 220.

According to a preferred embodiment, the auxiliary ventilation section 42 extends in length up to be in a region substantially proximal to the ventilation tube 224.

According to a preferred embodiment, the ventilation device 4 comprises a filter element 45 positioned near the outlet mouth 220 fluidically upstream of it. In other words, said filter element 45 is suitable for separating material suspended in the air and/or in the fuel moved through the ventilation duct 40. Preferably, said filter element 45 is positioned in the ventilation duct 40.

According to a preferred embodiment, the filter cartridge 1 further comprises a heater group 8 positioned fluidically upstream of the inlet mouth 210 preferably on the inlet end 21 suitable for heating the fuel entering the filtration chamber 20.

Preferably, the heater group 8 comprises a heating chamber into which the fuel to be filtered flows before crossing the inlet mouth 210; preferably, the heater group 8 in said heating chamber houses CTP elements the temperature of which can be electrically controlled. Preferably, by means of the heater group 8 any loose crystals of paraffin wax and/or ice, in suspension in the fuel, are dissolved.

Innovatively, the filter cartridge described above fully absolves the purpose of the present invention overcoming the drawbacks typical of the prior art.

Advantageously, in fact, the filter cartridge of the present invention is suitable in an increasingly efficient and effective manner, to avoid the problem of the accumulation of air inside the filtration chamber, and thereby keep each portion of the filter insert "bathed" by the fuel. Advantageously, the filtering surface affected by the flushing of the fuel is thus maximized.

In addition, advantageously, the filter cartridge of the present invention solves the aforesaid problem under any operating conditions of the vehicle, with the vehicle moving on a level road, uphill or downhill.

Advantageously, the filter cartridge is suitable to operate in a horizontal position.

In addition, advantageously, the risk that large air bubbles circulate in the fuel circulation circuit reaching the pump or injectors is obviated. Specifically, in fact, the ventilation of air being performed through the ventilation holes, any large air bubbles are divided into a number of small air bubbles.

Advantageously the use of a ventilation duct makes it possible to ensure the correct and complete ventilation of the circuit allowing the air bubbles trapped at some distance from the outlet to be captured.

Advantageously, the use of a ventilation duct makes it possible to easily realize the ventilation holes, check the size desired and ensure the desired resistance to the passage of air and fuel.

Advantageously, the use of a duct combined with a filter avoids unwanted fuel leaks downstream of the filter element.

A further advantage is that the filter cartridge 1 is suitable to emulsify the air in such a manner that the injectors then receive a constant quantity and thus work constantly and efficiently.

It is clear that a person skilled in the art may make modifications to the filter cartridge described above so as to satisfy contingent requirements, all contained within the scope of protection as defined by the following claims.

List of Reference Numbers:
1 filter cartridge
2 cartridge body
20 filtration chamber
201 dirty chamber
202 clean chamber
21 inlet end
210 inlet mouth
22 outlet end
220 outlet mouth
220' outlet antechamber
224 ventilation tube
224' ventilation tube hole
23 perimeter side walls
231 upper side wall
3 filter insert
4 ventilation device
40 ventilation duct
400 ventilation hole
400' head ventilation hole
401 ventilation spout
42 auxiliary ventilation section
420 auxiliary hole
45 filter element
5 water separation unit
51 separation device
52 blocking device
8 heater group
X-X main axis

The invention claimed is:

1. A filter cartridge for a fuel circulation circuit of a vehicle, comprising:
   a cartridge body fluidically connected to the fuel circulation circuit comprising an inlet mouth and an outlet mouth and between them a filtration chamber, which extends along a main axis;
   at least one filter insert extends along the main axis housed in the filtration chamber to filter the fuel, wherein the filter insert divides said filtration chamber into:
   i) a dirty chamber containing fuel to be filtered, wherein said dirty chamber is in fluidic communication with the inlet mouth and
   ii) a clean chamber containing the filtered fuel, wherein the clean chamber is in fluidic communication with the outlet mouth;
   a ventilation device suitable to ventilate air in the dirty chamber, wherein the ventilation device comprises at least one ventilation duct placed in an upper area of the filtration chamber in which the air floating in the fuel accumulates, wherein said ventilation duct has a plurality of ventilation holes mutually spaced from one another through which the air is removed from the filtration chamber.

2. The filter cartridge according to claim 1, wherein the cartridge body comprises an inlet end comprising the inlet mouth, an outlet end comprising the outlet mouth and perimeter side walls which laterally define the filtration chamber wherein the ventilation duct is placed in a top position, that is in a position proximal to an upper side wall of the cartridge body.

3. The filter cartridge according to claim 2, wherein the ventilation duct is made on the upper side wall of the cartridge body.

4. The filter cartridge according to claim 1, wherein the ventilation duct is a separate component from the cartridge body, placed on a dirty side thereof.

5. The filter cartridge according to claim 1, wherein the ventilation duct extends along the main axis and the ventilation holes are mutually axially spaced.

6. The filter cartridge according to claim 5, wherein said filter cartridge is suitable to be placed and to operate in the vehicle in a position substantially horizontal with respect to the ground plane in such a manner that the aforesaid main axis is in turn in a substantially horizontal position.

7. The filter cartridge according to claim 5, wherein the ventilation duct extends substantially along the entire axial length of the filtration chamber.

8. The filter cartridge according to claim 1, where the ventilation device is comprised in the filter insert, placed on a dirty side thereof.

9. The filter cartridge according to claim 1, wherein the ventilation device comprises a plurality of ventilation ducts.

10. The filter cartridge according to claim 1, wherein the ventilation holes have a diameter such as to facilitate the passage of air compared to that of the fuel.

11. The filter cartridge according to claim 1, wherein the ventilation duct comprises at least one head ventilation hole placed at its distal end.

12. The filter cartridge according to claim 1, where the at least one filter insert is of the tubular type, traversable radially from the outside to the inside, defining the dirty chamber outside it and clean chamber inside it.

13. The filter cartridge according to claim 12, comprising a plurality of filter inserts placed parallel to each other along the main axis.

14. The filter cartridge according to claim 1, wherein the ventilation device is fluidically connected to the outlet mouth, so that the action of moving the fuel through the outlet mouth also entails the ventilation action through the ventilation duct.

15. The filter cartridge according to claim 14, wherein the ventilation device comprises a filter element positioned in proximity to the outlet mouth fluidically upstream thereof.

16. The filter cartridge according to claim 1, wherein the outlet end comprises an outlet antechamber fluidically arranged between the filtration chamber and the filter insert and the outlet mouth.

17. The filter cartridge according to claim 16, wherein the ventilation duct comprises an auxiliary ventilation section which extends in a direction parallel to the main axis, into said outlet antechamber.

18. The filter cartridge according to claim 1, comprising a heater group positioned fluidically upstream of the inlet mouth on the inlet end suitable for heating the fuel in input to the filtration chamber.

19. The filter cartridge according to claim 12, comprising two filter inserts placed parallel to each other along the main axis.

20. The filter cartridge according to claim 1, comprising a heater group positioned fluidically upstream of the inlet mouth suitable for heating the fuel in input to the filtration chamber.

\* \* \* \* \*